United States Patent [19]

Tokunaga et al.

[11] Patent Number: 4,920,185

[45] Date of Patent: Apr. 24, 1990

[54] COLOR DEVELOPER FOR PRESSURE-SENSITIVE RECORDING PAPER AND PRODUCTION THEREOF USING A PHENOL-XYLENE-FORMALDEHYDE RESIN

[75] Inventors: Yukio Tokunaga; Yukio Saeki, both of Fujieda, Japan

[73] Assignee: Sumitomo Durez Company, Ltd., Tokyo, Japan

[21] Appl. No.: 302,242

[22] Filed: Jan. 27, 1989

[30] Foreign Application Priority Data

Jan. 29, 1988 [JP] Japan .................................. 63-16841

[51] Int. Cl.$^5$ ............................ C08G 8/28; C08G 8/32
[52] U.S. Cl. ..................................... 525/506; 528/160
[58] Field of Search ............................................ 525/506

[56] References Cited

U.S. PATENT DOCUMENTS

| | | | |
|---|---|---|---|
| 4,216,299 | 8/1980 | Kikuga et al. | 525/506 |
| 4,216,300 | 8/1980 | Kikuga et al. | 525/506 |
| 4,379,897 | 4/1983 | Asano et al. | 525/506 |
| 4,400,492 | 8/1983 | Asano et al. | 525/506 |
| 4,604,436 | 8/1986 | Thorpe et al. | 525/506 |
| 4,612,254 | 9/1986 | Ginter et al. | 525/506 |

*Primary Examiner*—John Kight, III
*Assistant Examiner*—Frederick Krass
*Attorney, Agent, or Firm*—James F. Tao; James F. Mudd

[57] ABSTRACT

The present invention relates to a polyvalent metal-bound carboxyl-modified p-substituted phenol-xylene-formaldehyde resin composition produced by binding with a polyvalent metal a p-substituted phenol-xylene-formaldehyde co-condensate containing a carboxyl group, to produce a color developer for pressure-sensitive recording paper. The polyvalene metal is selected from the group magnesium, aluminum, calcium, cadmium, zinc, nickel and manganese.

9 Claims, No Drawings

COLOR DEVELOPER FOR PRESSURE-SENSITIVE RECORDING PAPER AND PRODUCTION THEREOF USING A PHENOL-XYLENE-FORMALDEHYDE RESIN

The present invention relates to a color developer for pressure sensitive recording or manifold paper and to a process for producing said developer. This color developer is superior in color development performance and yellowing resistance and forms a color image which has good resistance to discoloration by light and water.

Pressure sensitive recording or manifold papers are known and employ a color producing reaction of an electron-donating colorless dye (hereinafter referred to as "coupler") generally in solution form contained in a microcapsule. Upon release of the solution from the capsule, by pressure rupture of the capsule, the coupler contacts an electron-accepting compound (hereinafter referred to as "developer") and produces a color.

Pressure sensitive manifold or recording systems have various methods of arrangement of the coupler and developer locations. A common type provides a top sheet comprising a substrate and the microencapsulated solution of the coupler coated on the underside of the substrate. This sheet is placed in contact with a second sheet comprising a substrate coated on the upper surface with a developer compound. Upon impact to the top sheet, the microcapsule's content is released and reacts with the developer on the second sheet, producing a colored image in the impact area, on the second sheet. This process can be repeated to produce multiple copies, by preparing a sheet comprising a substrate coated on the upper surface with the developer and on the lower surface with the microencapsulated coupler solution.

A mixture of microcapsules containing a coupler and the developer may be coated on the surface of a substrate, allowing a colored image to form on the surface when impact ruptures the microcapsule. Combinations of these coatings may be combined to produce multiple copy systems for office and home use.

Known developers include acid clay, zeolite, kaolin, and other inorganic substances and also include phenol compounds, novolak phenolic resin, polyvalent metal salts of aromatic carboxylic acids, polyvalent metal-bound carboxyl-modified terpene-phenolic resin, and other organic substances.

Inorganic developers are superior in initial color development; but they deteriorate in color development performance as they adsorb gases and moisture in the air during color development performance. Novolak phenolic resin, especially para-substituted phenol-formaldehyde resin, is superior in color development performance and produces a color image which is superior in resistance to discoloration by water. This color image, however, is liable to yellowing by sunlight and oxidizing gases (e.g., $NO_x$ and $SO_x$) in the air. Polyvalent metal salts of aromatic carboxylic acids have good color development performance and good resistance to yellowing by sunlight and oxidizing gases. However, they produce a color image which is poor in resistance to discoloration by water. Polyvalent metal-bound carboxyl-modified terpene-phenolic resin has good color development performance and provides a color image which has good resistance to discoloration by water. However, they provide a color image which is poor in resistance to yellowing by sunlight and oxidizing gases.

Conventional color developers have their own disadvantages as mentioned above, and they need improvement.

The present inventors carried out extensive studies to develop a color developer for pressure-sensitive recording paper which has good color development performance and resistance to yellowing and provides a color image which has good resistance to discoloration by light and water. As the result, it was found that a polyvalent metal-bound carboxyl-modified para-substituted phenol-xylene-formaldehyde resin has very good color development performance and resistance to yellowing and provides a color image which has very good resistance to discoloration by light and water. These findings led to the present invention.

SUMMARY OF THE INVENTION

The present invention concerns the preparation of an improved color developer for pressure sensitive recording or manifold paper, and the paper systems therefrom. The developer is a polyvalent metal bound, carboxyl modified para substituted phenol-xylene-formaldehyde resin composition, which is prepared by reacting a para-substituted phenol with a xylene-formaldehyde resin to form a co-condensate, which is then treated to form a carboxyl group in the co-condensate. The thus formed carboxyl modified p-substituted phenol-xylene-formaldehyde co-condensate is reacted with a polyvalent metal salt, e.g. zinc chloride to produce the desired resin which serves as the developer material.

DETAILED DESCRIPTION OF THE INVENTION

The present invention concerns the preparation of a improved color developer for pressure sensitive recording or manifold paper and systems, wherein the developer is a polyvalent metal bound carboxyl-modified p-substitutedephenol-xylene-formaldehyde resin composition produced by binding with a polyvalent metal a co-condensate of at least one kind of para-substituted phenol represented by the formula

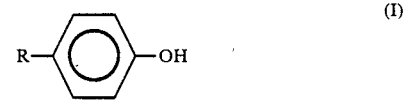
(I)

and xylene-formaldehyde resin, said co-condensate containing a carboxyl group and R denotes an alkyl group, cycloalkyl group, aryl group, alkylaryl group, or aralkyl group.

The para-substituted phenol which is used in the present invention and represented by the formula (I) above is a phenol having a substituent alkyl group, cycloalkyl group, aryl group, alkylaryl group, or aralkyl group at the para-position. The one in which the alkyl group has 1 to 12 carbon atoms is preferable. Examples of the para-substituted phenol include p-cresol, p-sec-butylphenol, p-tert-butylphenol, p-tert-octylphenol, p-nonylphenol, p-dodecylphenol, p-cycloheptylphenol, p-cyclohexylphenol, p-phenylphenol, p-naphthylphenol, p-tolylphenol, p-xylylphenol, p-styrenated phenol, and p-cumylphenol. Preferable among them are p-sec-butylphenol, p-tert-butylphenol, p-tert-octylphenol, and p-nonylphenol.

The p-substituted phenol should be used in an amount of 10 to 100 parts by weight, preferably 15 to 50 parts by weight, for 100 parts by weight of the xylene-formaldehyde resin. With p-substituted phenol in an amount less than 10 parts by weight, the resulting color developer would be poor in color development. With p-substituted phenol in an amount more than 100 parts by weight, the resulting color developer would be low in resistance to yellowing, poor in solubility in solvents, and hence inferior in initial color development.

The p-substitutedphenol-xylene-formaldehyde co-condensate is usually obtained by the co-condensation reaction of a p-substituted phenol with a xylene-formaldehyde resin. This reaction may be catalyzed by an inorganic or organic acid such as hydrochloric acid, sulfuric acid, phosphoric acid, oxalic acid, acetic acid, formic acid, p-toluenesulfonic acid, benzenesulfonic acid, and phenol-sulfonic acid.

The co-condensate is obtained by mixing a p-substituted phenol with a xylene-formaldehyde resin, performing condensation reaction at 90° to 150° C. in the presence of an acid catalyst, washing the reaction product to remove the acid catalyst, and finally removing water from the reaction product by distillation under reduced pressure. The reaction may be carried out in an aromatic hydrocarbon such as benzene, toluene, and xylene.

Time required for the co-condensation reaction varies depending on the kind and amount of raw materials and catalyst used. Usually, it is 1 to 10 hours.

This reaction brings about the cleavage of the ether group in the xylene-formaldehyde resin, yielding a reactive functional group. Its group and the methylol group in the xylene-formalehdyde resin react with the para-substituted phenol at its ortho position. The thus formed p-subsitutedephenol-xylene-formaldehyde co-condensate has usually a number-average molecular weight of 250 to 1200.

The addition of a carboxyl group to the p-subsitutedephenol-xylene-formaldehyde co-condensate can be accomplished by reacting the phenolic hydroxide with metallic sodium, sodium hydride, or sodium hydroxide to form sodium phenolate, and subsequently reacting the sodium phenolate with carbon dioxide gas with heating under pressure. The sodium phenolate forming reaction and the carboxyl group adding reaction may be carried out in an aromatic hydrocarbon solvent such as benzene, toluene, and xylene, or an ether such as dioaxane and tetrahydrofuran.

The thus formed carboxyl-modified p-subsituted-phenol-xylene-formaldehyde resin is usually bound with a polyvalent metal by either of the following methods.

(1) The resin is reacted with an oxide, hydroxide, chloride, carbonate, or sulfate of a polyvalent metal at 100° to 150° C. in the presence of an inorganic ammonium salt such as ammonium carbonate or ammonium bicarbonate.

(2) The resin is dissolved in water or alcohol together with an alkali metal hydroxide such as potassium hydroxide or sodium hydroxide, and a water-or alcohol-soluble salt of a polyvalent metal is added to the solution for reaction. (Metathetical reaction method)

The reaction product is subsequently washed with water and dried. Thus there is obtained a polyvalent metal-bound carboxyl-modified p-substituted phenol-xylene-formaldehyde resin.

The polyvalent metal is selected from salt-forming metals. Preferred examples include magnesium, aluminum, calcium, cadmium, titanium, zinc, nickel, cobalt, and manganese. Most desirable among them are zinc and nickel.

The thus obtained polyvalent metal-bound carboxyl-modified p-subsitutedphenol-xylene-formaldehyde resin composition is used as such as a color developer for pressure-sensitive recording paper.

Pressure-sensitive recording paper containing the color developer of the present invention is produced by any one of the following methods.

(1) The color developer is dispersed into water, and the resulting dispersion is applied to or infiltrated into a substrate incorporated with an inorganic pigment, binder, etc.

(2) The color developer is dissolved in an organic solvent, and the resulting solution is applied to or infiltrated into a substrate incorporated with an inorganic pigment, binder, etc.

(3) The color developer is incorporated into a substrate during its production.

(4) A coupler or coupler-containing microcapsules are further added in any one of the above-mentioned methods.

The color developer of the present invention can be used as ink after dissolution in a solvent. The ink is applied by printing to a specific part of a substrate in which color development is required.

The substrate that can be used include paper, synthetic paper, plastics film, metal foil, and their composites. The inorganic pigment that can be used include acid clay, activated clay, kaolin, calcium carbonate, aluminum hydroxide, talc, and zeolite, etc. The binder that can be used include a latex, water-soluble binder, and water-dispersible binder, etc.

There are several methods of preparing pressure-sensitive recording paper from the color developer of the present invention as mentioned above; but they do not restrict the scope of the invention.

The polyvalent metal-bound carboxyl-modified p-substituted phenol-xylene-formaldehyde resin of the present invention may be used in combination with any known inorganic or organic color developer such as acid clay, para-substituted phenol-formaldehyde resin and metal salts thereof, and aromatic carboxylic acid and metal salts thereof. It may also be incorporated with any known anti-oxidant, UV light absorber, etc.

The color developer of the present invention is very effective for any conventional coupler used for pressure-sensitive recording paper, and it can be used in combination with, for example, fluoran coupler, triphenylmethane phthalide coupler, spiropyran coupler, phenothiazine coupler, triphenylmethane coupler, and indole coupler.

The polyvalent metal-bound carboxyl-modified p-substituted phenol-xylene-formaldehyde resin of the present invention is by far superior to any known inorganic and organic color developer for pressure-sensitive record paper in color developing performance, resistance to yellowing, and ability to form a color image which has good resistance to discoloration by light and water. It is suitable for high-quality pressure-sensitive recording paper.

The invention will be described in more detail with reference to the following examples, which are not intended to restrict the scope of the invention. In examples, "parts" means "parts by weight".

EXAMPLE 1

A mixture composed of 30 parts of p-sec-butylphenol, 100 parts of xylene-formaldehyde resin (Nikanol-H made by Mitsubishi Gas Chemical Co., Ltd.), and 1 part of conc. hydrochloric acid (35%) was heated at 100° C. for 6 hours. The reaction produce was washed with hot water to remove hydrochloric acid and freed of water by distillation under reduced pressure. Thus, there was obtained 124 parts of p-sec-butylphenol-xylene-formaldehyde resin.

This co-condensate (50) parts was dissolved in 100 parts of dehydrated, purified toluene, and the solution was placed in a pressure reaction kettle having an internal volume larger than twice the volume of the solution. To the kettle was added 1.9 parts of metallic sodium. The contents were stirred at 100° C. for 1 hours. Carbon dioxide gas was introduced into the kettle until the internal pressure reached 30 kg/cm$^2$. Reaction was carried out at 150° C. for 24 hours.

After cooling, the reaction product was extracted with water, neutralized with hydrochloric acid, and extracted with toluene, and the extract was freed of solvent by distillation. Thus there was obtained 28 parts of carboxyl-modified p-sec-butylphenol-xylene-formaldehyde resin.

To 28 parts of this carboxyl-modified p-sec-butylphenol-xylene-formaldehyde resin were added 13 parts of zinc benzoate and 13 parts ammonium bicarbonate, followed by reaction of 150° C. for 1 hour. Thus there was obtained 30 parts of zinc-bound carboxyl-modified p-sec-butylphenol-xylene-formaldehyde resin composition having a softening point of 94° C.

EXAMPLE 2

A mixture composed of 25 parts of p-nonylphenol, 100 parts of xylene-formaldehyde resin (Nikanol-LLL), and 1 part of p-toluenesulfonic acid was heated at 100° C. for 10 hours. The reaction product was washed with hot water to remove p-toluenesulfonic acid. Thus there was obtained a co-condensate.

To 200 parts of this co-condensate were added 200 parts of toluene and 5 parts of sodium hydroxide. Reaction was carried out until the internal temperature reached 115° C., during which water was removed from the azeotropic mixture. After cooling, the sodium was placed in a pressure reaction kettle having an internal volume larger than twice the volume of the solution. Into the kettle was introduced carbon dioxide gas until the internal pressure reached 30 kg/cm$^2$. Reaction was carried out at 150° C. for 24 hours.

After cooling, the reaction product was purified in the same manner as in Example 2. Thus there was obtained 37 parts of carboxyl-modified p-styrenated phenol-xylene-formaldehyde resin having a softening point of 96° C.

37 parts of this carboxyl-modified p-styrenated phenol-xylene-formaldehyde resin was subjected to the zinc-binding reaction in the same manner as in Example 2. Thus there was obtained 40 parts of zinc-bound carboxyl-modified p-styrenated phenol-xylene-formaldehyde resin having a softening point of 110° C.

COMPARATIVE EXAMPLE 1

The same procedure as in Example 2 was repeated except that the p-nonylphenol was replaced by phenol. Thus there was obtained 47 parts of zinc-bound carboxyl-modified phenol-mesitylene-formaldehyde resin composition having a softening point of 115° C.

COMPARATIVE EXAMPLE 2

A mixture composed of 170 parts of p-phenylphenol, 22.5 parts of 80% paraformaldehyde, 1.7 parts of p-toluenesulfonic acid, and 200 parts of toluene was heated at 100° C. for 2 hours. The reaction product was freed of toluene and water by distillation under reduced pressure. Thus there was obtained 172 part of light brown p-phenylphenol-formaldehyde-resin having a softening point of 85° C.

40 parts each of the resin obtained in Examples 1, 2, and 3 and Comparative Examples 1 and 2 and zinc 3,5-ditert-butyl-salicylate was ground (by wet process) for 8 hours using an attritor together with 1 part of anionic surface active agent (Orotan 731, made by Rohm & Haas Co.), 0.1 internal pressure reached 30 kg/cm$^2$. Reaction was carried out at 150° C. for 24 hours.

After cooling, the reaction product was extracted with water, neutralized with hydrochloric acid, and extracted with benzene again, and the extract was freed of solvent by distillation. Thus there was obtained 76 parts of carboxyl-modified p-nonylphenol-xelene-formaldehyde resin, having a softening point of 85° C.

50 parts of this carboxyl-modified p-nonylphenol-xylene-formaldehyde resin was dissolved in 200 parts of methanol. To the solution was added 3.0 parts of potassium hydroxide, followed by mixing at 80° C. for 1 hour. After cooling to 40° C., the mixture was reacted with 7.7 parts of zinc chloride at 40° C. for 1 hour. The reaction product was freed of solvent and dried. Thus there was obtained 51 parts of zinc-bound carboxyl-modified p-nonylphenol-xylene-formaldehyde resin composition having a softening point at 98° C.

EXAMPLE 3

A mixture composed of 35 parts of p-styrenated phenol, 100 parts of xylene-formaldehyde resin (Nikanol-L made by Mitsubishi Gas Chemical Co., Ltd.), and 15 parts of oxalic acid was heated at 130° C. for 8 hours. The reaction product was washed with hot water to remove oxalic acid. The reaction product was further reacted with 40 parts of methanol and 7.8 parts of sodium hydroxide for 2 hours under refluxing. The reaction product was freed of methanol and water by distillation under reduced pressure. Thus there was obtained 133 parts of sodium salt of p-styrenated phenol-xylene-formaldehyde resin having a softening point of 72° C.

50 parts of this sodium salt of p-styrenated phenol-xylene-formaldehyde resin was placed in a pressure reaction kettle having an internal volume larger than twice the volume of the sodium salt of the resin. Into the kettle was introduced carbon dioxide gas until the parts of PVA powder, and 58.9 parts of water. Thus there was obtained a dispersion containing particles smaller than 5mm in diameter.

The dispersion was uniformly mixed for 1 hour with the ingredients shown in Table 1 using a laboratory mixer to give a coating solution. The coating solution was applied to fine paper in such an amount that the coating weight (dry basis was 5g/m$^2$. Thus there were obtained six kinds of recording paper having a color developer layer on the surface thereof.

The six kinds of color developing paper were tested for color developing performance, resistance to yellowing, resistance to discoloration by light, and resistance to discoloration by water. The results are shown in Table 2. It is noted from Table 2 that all the kinds of color developing paper obtained in Examples are superior in every respect to those obtained in Comparative Examples.

Test methods (a) Color developing performance

The color developing paper is pressed under a roll, with a piece of commercial colorless dye capsule paper placed thereon. The reflective color density is measured at 30 seconds and one hour after the pressure is applied, using Macbeth color densitometer. (White standard card: 0.05, black standard card: 1.76)

(b) Resistance to yellowing

The color developing paper is irradiated for 16 hours with light from a low-pressure mercury lamp, and the Hunter whiteness is measured before and after irradiation.

(c) Resistance to discoloration by light

The color developing paper which has undergone color development in the same manner as in the color developing test is irradiated for 8 hours with light from a low-pressure mercury lamp, and the reflective color density is measured before and after irradiation.

(d) Resistance to discoloration by water

The color developing paper which has undergone color development in the same manner as in the color developing test is immersed in water for 30 minutes, and the reflective color density is measured before and after irradiation.

TABLE 2

| | Performance of Recording Sheet | | | | | | | |
|---|---|---|---|---|---|---|---|---|
| | Color development | | Resistance to yellowing | | Resistance to discoloration by light | | Resistance to discoloration by water | |
| Example | 30 s. | 1 h. | before | after | before | after | before | after |
| Example 1 | 0.45 | 0.66 | 88 | 87 | 0.68 | 0.45 | 0.68 | 0.65 |
| Example 2 | 0.47 | 0.65 | 89 | 88 | 0.67 | 0.44 | 0.67 | 0.65 |
| Example 3 | 0.47 | 0.68 | 90 | 87 | 0.70 | 0.49 | 0.70 | 0.67 |
| Comparative Example 1 | 0.28 | 0.55 | 88 | 68 | 0.58 | 0.31 | 0.58 | 0.41 |
| Comparative Example 2 | 0.37 | 0.62 | 89 | 77 | 0.64 | 0.18 | 0.64 | 0.62 |
| Zinc salicylate* | 0.41 | 0.64 | 89 | 87 | 0.66 | 0.38 | 0.66 | 0.21 |

*zinc 3,5-di-tert-butyl salicylate
"before" and "after" mean "before irradiation" and "after irradiation", respectively.

We claim:

1. A color developer for pressure sensitive recording paper comprising a polyvalent metal-bound carboxyl-modified p-subsituted phenol-xylene-formaldehyde co-condensate containing a carboxyl group, wherein the co-condensate is formed by condensing p-substituted phenol and a xylene-formaldehyde resin in the ratio 10-100 parts p-substituted phenol to 100 parts xylene-formaldehyde resin, adding a carboxyl group to said co-condensate and bonding with the polyvalent metal.

2. A color developer as described in claim 1, wherein the substituent group in the para position is selected from an alkyl group, a cycloalkyl group, an aryl group, an alkylaryl group or an aralkyl group.

3. A color developer as described in claim 2, wherein the substituent group contains 1 to 12 carbon atoms.

4. A color developer as described in claim 2, wherein the polyvalent metal is selected from the group consisting of magnesium, aluminum, calcium, cadmium, titanium zinc, nickel, cobalt and manganese.

5. A color developer as described in claim 4, wherein the polyvalent metal is zinc or nickel.

6. A color developer as described in claim 5, wherein the polyvalent metal is zinc.

7. A color developer as described in claim 1, wherein the co-condensate ratio is 15 to 50 parts p-substituted phenol to 100 parts xylene-formaldehyde resin.

8. A color developer for pressure sensitive recording paper comprising a polyvalent metal-bound carboxyl modified p-substituted phenol-xylene-formaldehyde co-condensate containing a carboxyl group, wherein the polyvalent metal is zinc or nickel; the p-substituted phenol component contains an alkyl group having 1 to 12 carbon atoms; and the ratio of p-substituted phenol to xylene-formaldehyde resin is 15 to 50 parts alkylphenol per 100 parts xylene-formaldehyde resin.

9. A color developer for pressure sensitive recording paper comprising a polyvalent metal-bound carboxyl-modified p-substituted phenol-xylene-formaldehyde co-condensate containing a carboxyl group, wherein the polyvalent metal-bound carboxyl-modified p-substituted phenol-xylene-formaldehyde co-condensate containing a carboxyl group is formed by binding with a polyvalent metal a carboxyl-modified p-substituted phenol-xylene-formaldehyde co-condensate containing a carboxyl group, wherein the ratio of p-substituted phenol to xylene-formaldehyde is 10 to 100 parts of p-substituted phenol to 100 parts of xylene-formaldehyde.

* * * * *